US006267804B1

(12) United States Patent
Marlowe

(10) Patent No.: US 6,267,804 B1
(45) Date of Patent: Jul. 31, 2001

(54) WET GAS STRIPPER

(75) Inventor: G. Delane Marlowe, Mooresville, NC (US)

(73) Assignee: TAS Enterprise, LLC., Morresville, NC (US)

( * ) Notice: Subject to any disclaimer, the term of this patent is extended or adjusted under 35 U.S.C. 154(b) by 221 days.

(21) Appl. No.: 08/815,747

(22) Filed: Mar. 12, 1997

Related U.S. Application Data

(60) Provisional application No. 60/016,598, filed on May 8, 1996, now abandoned.

(51) Int. Cl.[7] .................................................. B01D 50/00
(52) U.S. Cl. ................................. 96/237; 96/273; 96/277
(58) Field of Search .......................... 55/220, 239, 240, 55/242, 228, 229, 241; 96/237, 239, 273, 277

(56) References Cited

U.S. PATENT DOCUMENTS

| 997,581 | * | 7/1911 | Prinz ........................................ 55/240 |
| 1,041,617 | * | 10/1912 | Goodrich ................................ 55/242 |
| 1,117,309 | * | 11/1914 | Bentz ...................................... 55/242 |
| 1,908,782 | * | 5/1933 | Pearce .................................... 55/229 |
| 2,057,579 | * | 10/1936 | Kurth ...................................... 55/242 |
| 2,802,543 | * | 8/1957 | Clark ...................................... 55/242 |
| 3,105,103 | * | 9/1963 | Old ......................................... 55/220 |
| 3,246,452 | * | 4/1966 | Arvanitakis ............................ 55/229 |
| 3,266,224 | * | 8/1966 | Ferretti ................................... 55/240 |
| 3,556,734 | * | 1/1971 | Peterson ................................. 55/240 |
| 3,655,171 | * | 4/1972 | Miller, Jr. .............................. 55/242 |
| 3,733,789 | * | 5/1973 | Rebours .................................. 55/240 |
| 3,993,448 | * | 11/1976 | Lowery, Sr. ............................ 55/239 |
| 4,609,386 | * | 9/1986 | Sibley et al. ........................... 55/229 |
| 4,775,499 | * | 10/1988 | Hongo et al. .......................... 55/240 |

FOREIGN PATENT DOCUMENTS

391419 * 10/1908 (FR) ....................................... 55/241

* cited by examiner

*Primary Examiner*—C. Scott Bushey
(74) *Attorney, Agent, or Firm*—Hopgood, Calimafde Judlowe & Mondolino

(57) ABSTRACT

A wet gas stripper is provided for separating particulate matter entrained in a moving gas stream. The gas stripper includes a housing having a plurality of walls, and a gas inlet for receiving the moving gas stream into the housing and a gas outlet through which the moving gas stream is exhausted from the housing. A particulate collection area is formed at a base of the housing. A liquid spray element sprays a liquid against at least one of the walls of the housing above the particulate collection area to create a particulate-entraining mist. The mist defines a filtration medium for capturing the particulate matter entrained in the gas stream and carrying the particulate matter to the collection area for removal from the housing.

9 Claims, 7 Drawing Sheets

WET GAS STRIPPER

This application was filed as provisional application No. 60/016,598 on May 8, 1996, now abandoned.

TECHNICAL FIELD AND BACKGROUND OF THE INVENTION

This invention relates to a wet gas stripper which utilizes a liquid spray for separating entrained particulate matter, such as traces of acid, methylene chloride, toluene diisocyanate, and other relatively fine powdered substances, from a moving gas stream. The invention is particularly applicable for use in industrial plants which emit hazardous gases.

The presumed operating theory of the invention relates to the generation of negative ions inside a liquid-saturated environment. It is believed that the collision of a liquid, such as water, against a hard surface causes the liquid to lose electrons which then attach to chemical vapors and small particulates, such as smoke, entrained in the moving gas stream to be filtered. This collision creates a turbulent mist which captures and carries the vapors and particulates downwardly to a collection bath. Because the liquid loses electrons, its now positive charge attracts any negatively charged particles to capture the particles. The invention has been tested and proven to effectively remove toxic chemicals, such as methylene chloride, from the moving gas stream, and to further remove odors and particulates such as smoke. The invention further causes oxygenation of liquid as a result of the collision against the hard surface. Once the chemicals are captured in the collection bath, they are oxidized into non-toxic compounds.

SUMMARY OF THE INVENTION

Therefore, it is an object of the invention to provide a wet gas stripper which utilizes a liquid spray for separating entrained particulate matter from a moving gas stream.

It is another object of the invention to provide a wet gas stripper which is capable of oxidizing most hazardous/toxic organics and liquids used in an industrial environment, and converting these organics and liquids into substances that are non-toxic and safe for handling.

It is another object of the invention to provide a wet gas stripper which transforms electrical forces to overcome the high vapor pressures of methylene chloride in order to remove this chemical from the moving gas stream.

It is another object of the invention to provide a wet gas stripper which extracts methylene chloride from within an industrial environment, and converts the methylene chloride into carbon dioxide, water, and benign oxidation products of chlorine.

It is another object of the invention to provide a wet gas stripper which is capable of removing toluene diisocyanate from an industrial environment, and rendering this chemical safe for handling.

It is another object of the invention to provide a wet gas stripper which is capable of removing butylated hydroxy toluene from an industrial environment, and rendering this chemical safe for handling.

It is another object of the invention to provide a wet gas stripper which is capable of removing odors and smoke from an industrial environment.

It is another object of the invention to provide a wet gas stripper which is relatively inexpensive to manufacture and operate.

It is another object of the invention to provide a wet gas stripper which is efficient and relatively easy to maintain.

It is another object of the invention to provide a wet gas stripper which provides a cost effective anti-pollution device that makes significant contribution towards compliance with mandates incorporated in the U.S. Clean Air Act, the U.S. Clean Water Act, the U.S. Resources Conservation & Recovery Act, and the U.S. Occupational & Safety Health Administration.

These and other objects of the present invention are achieved in the preferred embodiments disclosed below by providing a wet gas stripper for separating particulate matter entrained in a moving gas stream. The gas stripper includes a housing having a plurality of walls, and a gas inlet for receiving the moving gas stream into the housing and a gas outlet through which the moving gas stream is exhausted from the housing. A particulate collection area is formed at a base of the housing. A liquid spray element sprays a liquid against at least one of the walls of the housing above the particulate collection area to create a particulate-entraining mist. The mist defines a filtration medium for capturing the particulate matter entrained in the gas stream and carrying the particulate matter to the collection area for removal from the housing.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
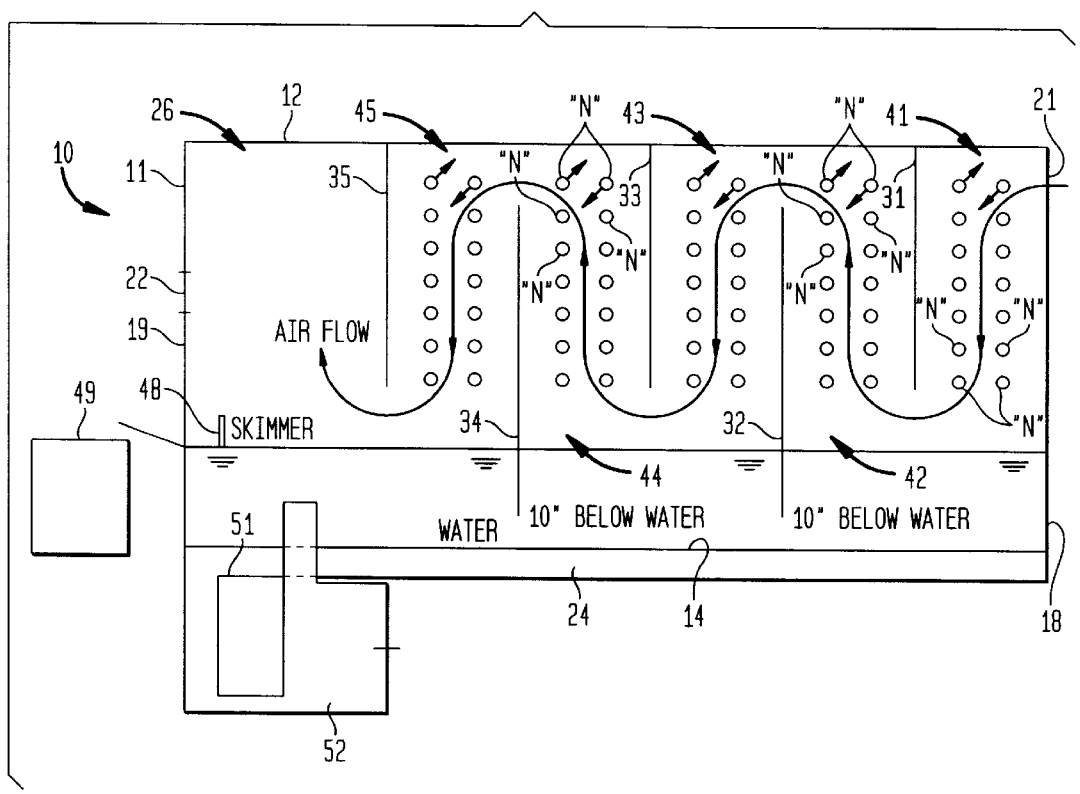
FIG. 1 is a schematic side elevational view of the wet gas stripper according to one preferred embodiment of the invention.

Referring now specifically to the drawings, a wet gas stripper according to the present invention is illustrated schematically in FIG. 1 and shown generally at reference numeral 10. The gas stripper 10 is used for filtering particulate matter, such as smoke and dust, entrained in a moving gas stream, and is particularly applicable for use in industrial plants which emit hazardous gases containing methylene chloride, toluene diisocyanate, and butylated hydroxy toluene. The term "smoke" is defined herein as a dispersion of liquid or solid particles, usually less than one micron in size and so small as not to be individually visible. The gas stripper 10 is further applicable for transforming hazardous/toxic chemical vapors into compounds safe for handling.

The gas stripper 10 includes a housing 11 having a top wall 12, a bottom wall 14, opposing side walls 15 and 16, and front and rear end walls 18 and 19. The gas stream enters the gas stripper 10 through an inlet 21 formed in the front end wall 18 and moves downstream through the housing 11 to an outlet 22 formed in the rear end wall 19. According to one embodiment, the housing 11 is 10 feet tall, 19 feet long, and 5 feet wide.

Figure 2:
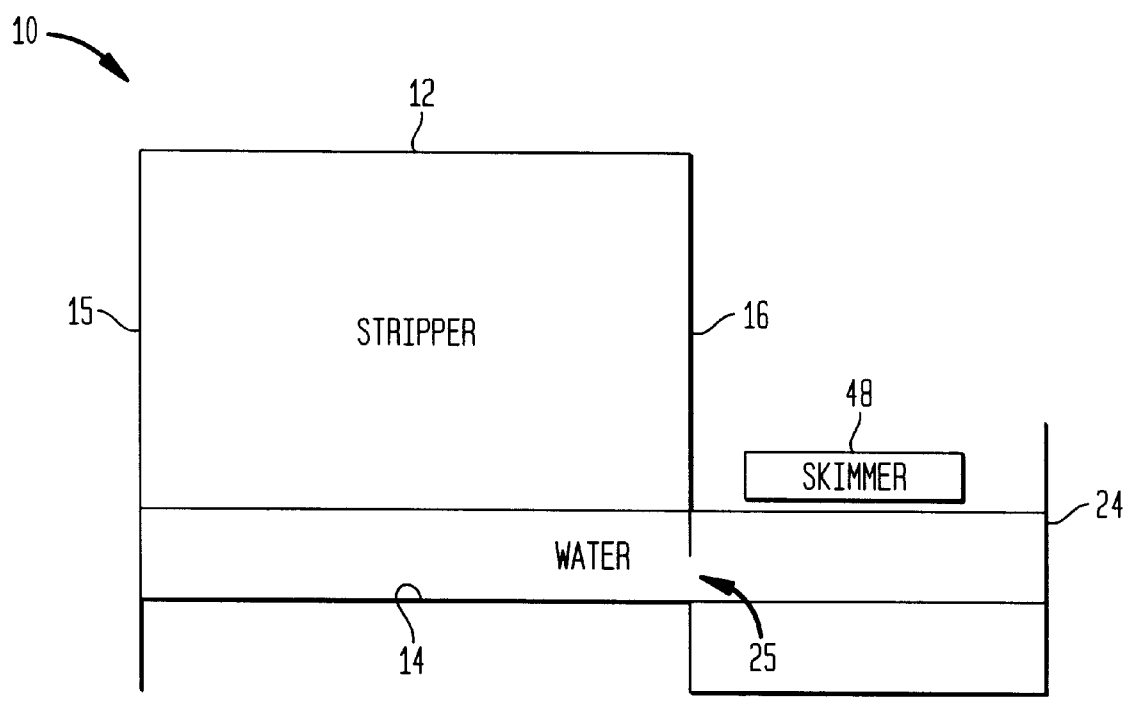
FIG. 2 is a schematic rear end view of the wet gas stripper shown in FIG. 1.
Figure 3:
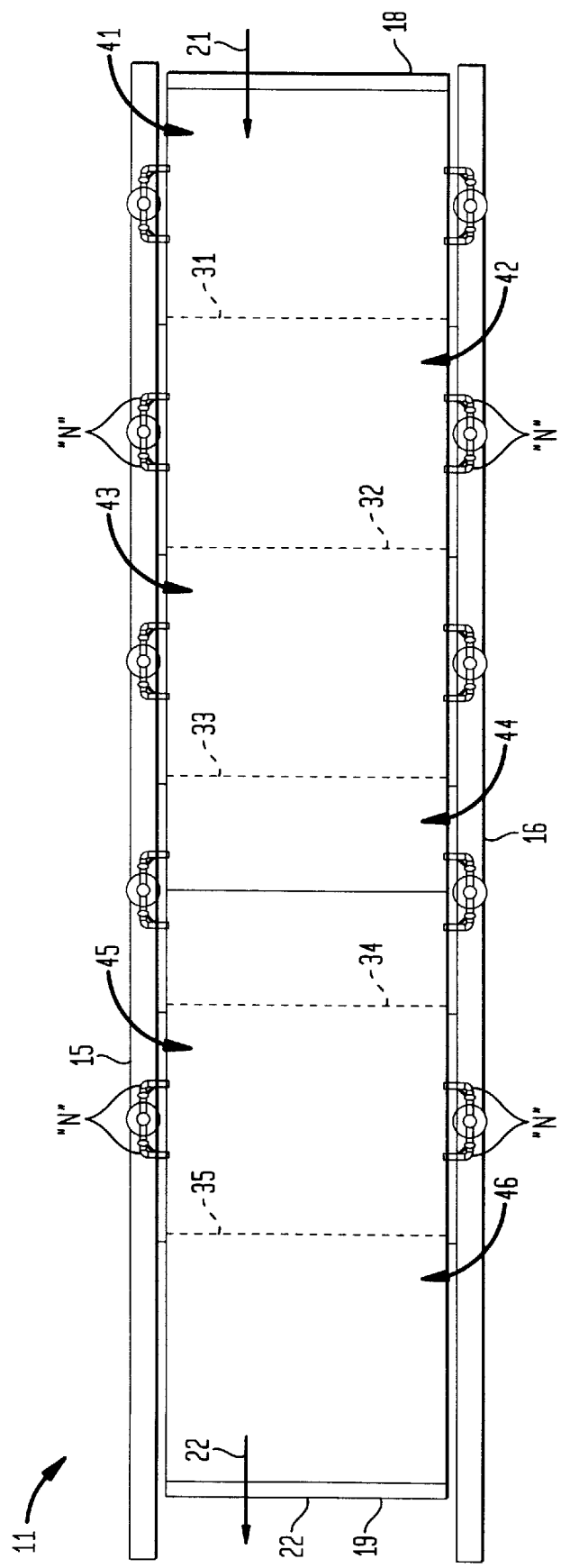
FIG. 3 is a top plan view of the housing for the wet gas stripper with the top wall removed.
Figure 4:
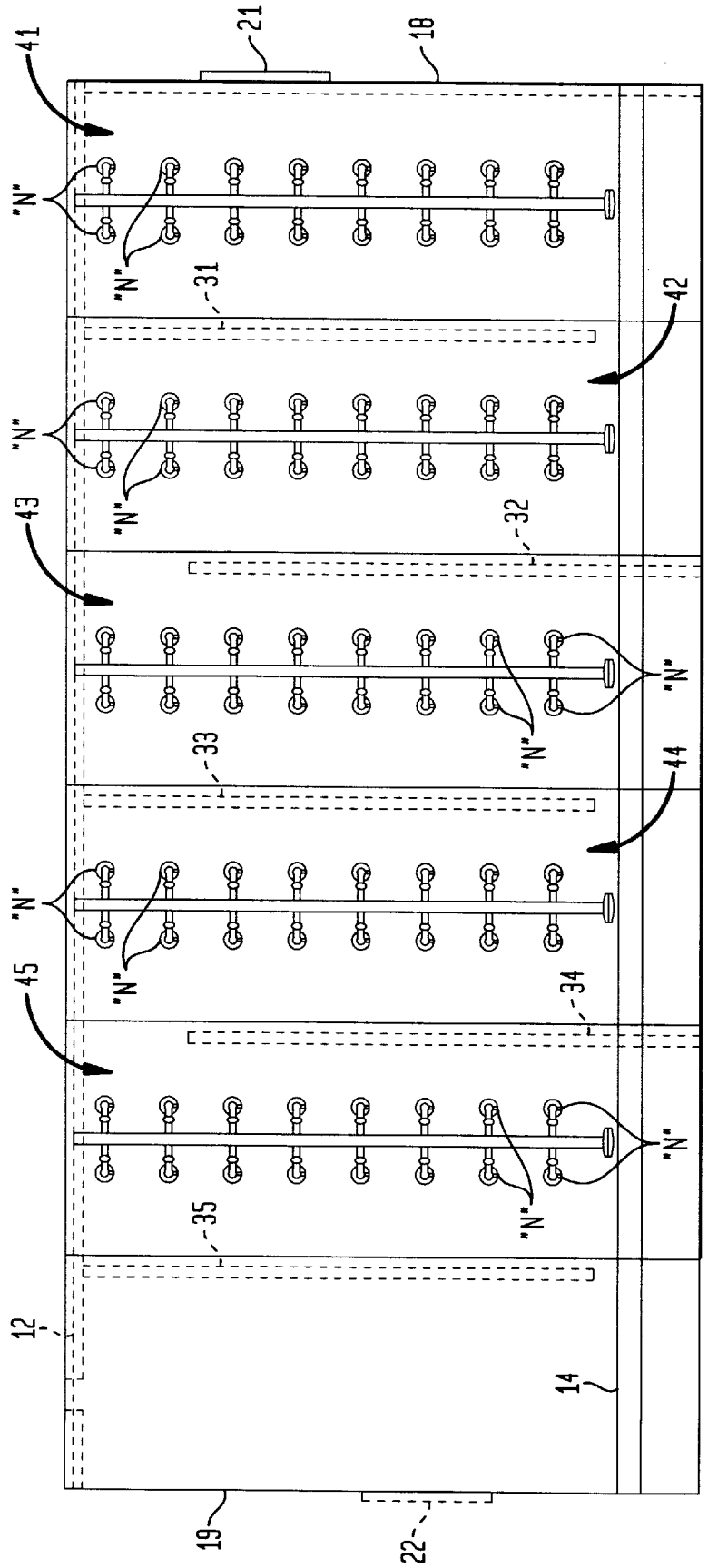
FIG. 4 is a side elevational view of the housing with the side wall removed.
Figure 5:
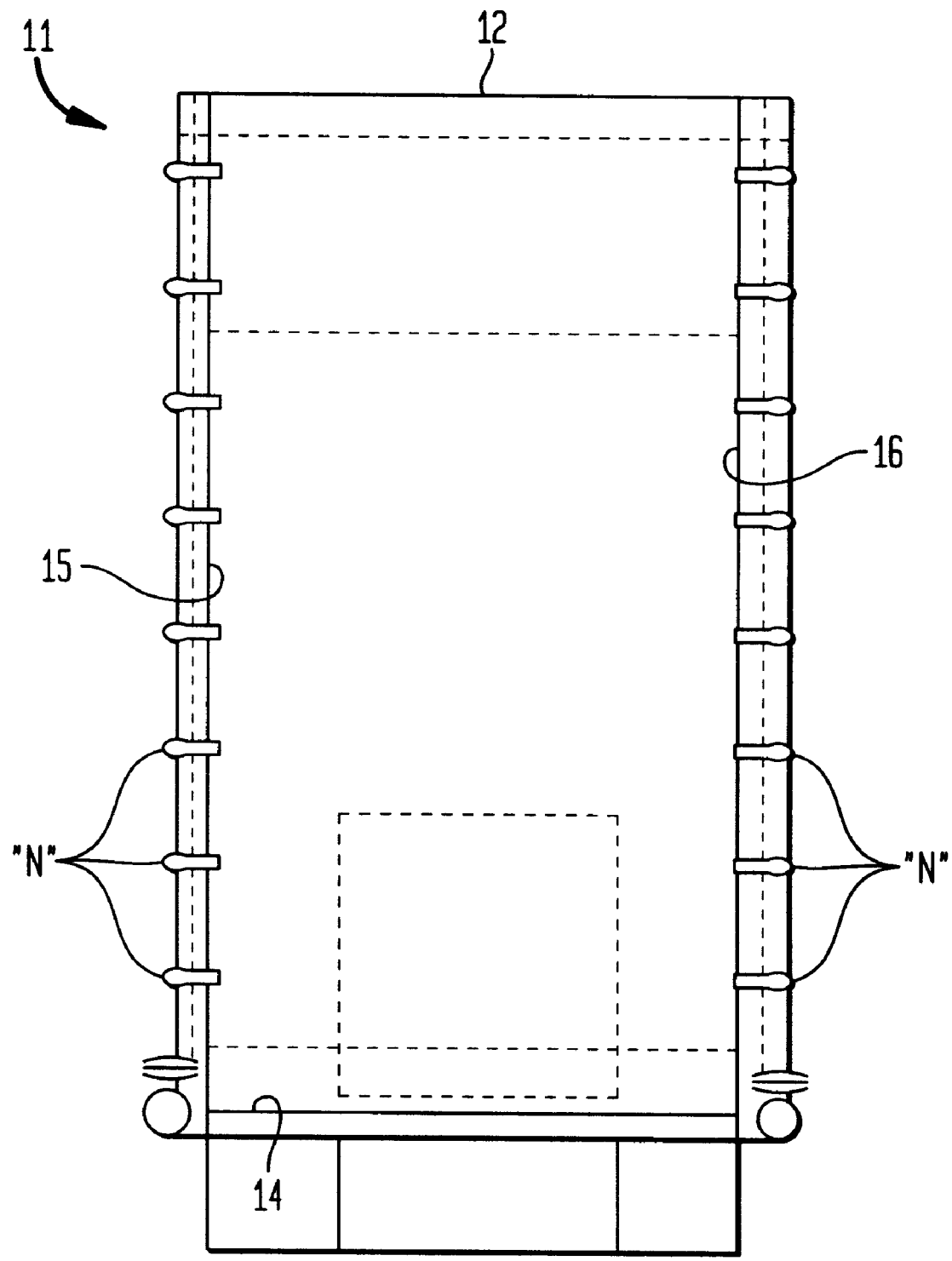
FIG. 5 is a rear end view of the housing with the rear end wall removed.

As best shown in FIG. 2, the bottom wall 14 of the housing 11 is connected to the side wall 15 and front and rear end walls 18 and 19, and extends in a generally horizonal or slightly downwardly angled plane towards the opposite side 16 wall where it connects to the side edge of a partially sunken particulate collection bath 24. The side wall 16 extends downwardly from the top wall 12 to a point about 4 inches above the connecting edges of the bottom wall 14 and collection bath 24 to form a side opening 25 communicating with the bath 24 and extending longitudinally from one end wall 18 of the housing 11 to the other end wall 19. The bottom wall 14, side wall 15, and end walls 18 and 19 are sealably connected together to hold a liquid, such as water, which passes freely through the side opening 25 into the bath 24. The water level is preferably maintained at about 14 inches above the bottom wall 14 such that the side wall 16 extends downwardly about 10 inches into the water, thereby forming a seal against gas leakage outwardly through the side opening 25. The depth of water in the bath is about 24 inches.

A number of longitudinally-spaced baffles 31, 32, 33, 34, and 35 are attached respectively to the opposing side walls 15 and 16 of the housing 11 and reside in alternating upper and lower spaced positions. The baffles 31, 33, and 35 in the upper position are connected to the top wall 12 and extend vertically downwardly to a point about 21 inches above the bottom wall 14 of the housing 11 and about 7 inches above the water level. The baffles 32 and 34 in the lower position extend vertically upwardly from the bottom wall 14 to a point about 24 inches from the top wall 12. The first baffle 31 is spaced about 48 inches from the front end wall 18 of the housing 11 and cooperates with the front end wall 18 define a first gas stripping station 41. Successive baffles 32, 33, 34, and 35 are spaced about 45 inches from each other to define respective second, third, fourth, and fifth gas stripping stations 42, 43, 44, and 45. The end baffle 35 and end wall 19 of the housing 11 cooperate to form a gas flow reduction station 46. The outlet 22 formed in the rear end wall 19 of the gas flow reduction station 46 communicates with an exhaust duct (not shown) which runs in a generally U-shaped path around the housing 11 before entering an exhaust stack (not shown) through which the filtered gas stream is exhausted to the atmosphere. The exhaust stack is preferably about 30 feet tall and has a diameter of about 50 inches. The dimensions and spacing of the baffles 31–35 may vary depending upon the total volume of gas moved through the stripper 10 per minute.

Each air stripping station 41–45 includes between 6 and 8 pairs of vertically-spaced water spray nozzles "N" located adjacent to each side wall 15 and 16 of the housing 11. The spray nozzles "N" are aimed in a horizonal direction towards the opposite side wall 15 or 16 of the housing 11 for spraying at pressures of as little as 15 psi to just below the cutting threshold pressure. The velocity of the water outwardly from the nozzles "N" is sufficient to bounce the spray off the opposite side wall 15 or 16 to create a particulate-entraining, turbulent mist. The turbulent mist forms a filtration medium which captures the particulate matter entrained in the gas stream and carries the particulate matter downwardly to the collection bath 24 for removal from the housing 11. The angle of each spray pattern is between 80 and 110 degrees.

Preferably, a mechanical pump is connected through piping to the collection bath 24 and to the spray nozzles "N" to recycle the water in the gas stripper 10 through the nozzles "N". The pump may be any conventional diaphragm, screw, vane, piston, or plunger type pump.

OPERATION OF THE GAS STRIPPER 10

As mentioned above, the moving gas stream enters the gas stripper 10 through the inlet 21 formed in the front wall 18 of the housing 11. The inlet 21 communicates with duct work and six impeller-type fans (not shown) which rapidly force large volumes of the air from the surrounding atmosphere into the housing 11. The fans are preferably mounted in succession within the duct work at about 10 foot intervals, and are collectively capable of moving over 30,000 cfm of air through the gas stripper 10. Each fan has a diameter of about 15 inches, and can handle 14 to 16 inches of static pressure and deliver 5700 cfm at 7 inches of static pressure. The dimension of the gas inlet 21 is about 40 inches by 40 inches.

As the moving air stream enters the housing 11 through the inlet 21 it follows a generally "S" shaped path through the five air stripping stations 41–45 described above. The particulate-entraining mist created by the water spray and the forced air flow path though the stations 41–45 operate to strip particular matter and other impurities from the gas stream as it moves downstream through the housing 11. These impurities are carried downwardly by the turbulent mist and gravity into the particulate collection bath 24. Any residue floating on the top surface of the water in the bath 24 is removed by a paddle-type, reciprocating skimmer 48, and deposited in a portable skim container 49 shown in FIG. 1. Any liquid or matter heavier than water falls to the bottom of the bath 24 and is directed through a waste-collection opening 51 leading to a separate storage container 52 located beneath the gas stripper 10. This container 52 is periodically drained as needed, and the bath 24 refilled to maintain a consistent water level. A float or other suitable indicator (not shown) is used to determine when the container 52 should be drained and the stripper 10 refilled.

After leaving the final stripping station 45, the gas stream enters the gas flow reduction station 46 in the housing 11. The gas flow reduction station 46 has sufficient volume to substantially reduce the velocity of the filtered gas steam, and to allow the release of moisture from the gas stream before exiting the housing 11 though the outlet 22. The exhaust duct connected to the outlet 22 allows further release of moisture as the gas stream passes to the vertical exhaust stack for emission to the atmosphere.

Figure 6:
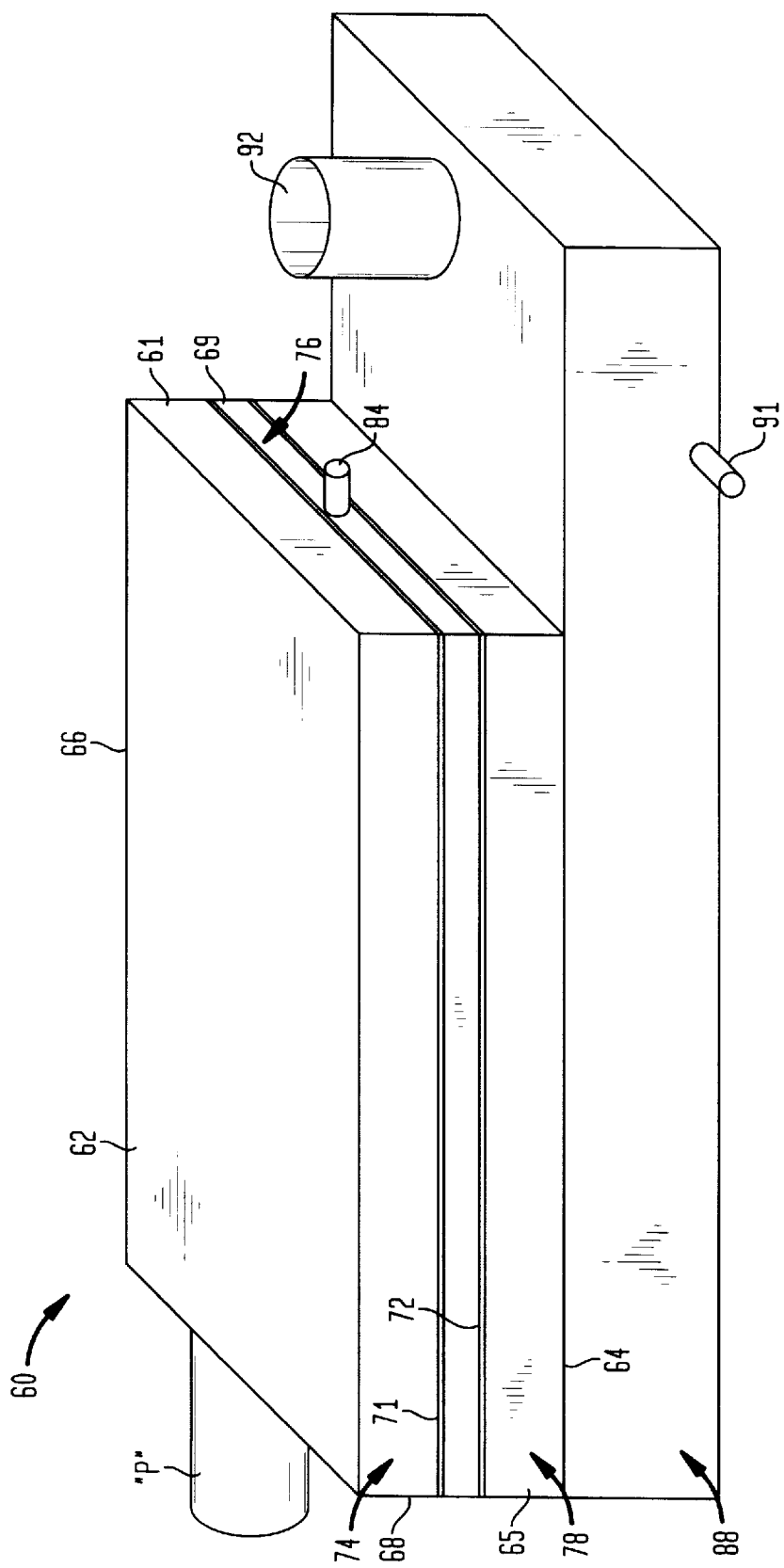
FIG. 6 is a perspective view a wet gas stripper according to a second preferred embodiment of the invention for use on a vehicle.
Figure 7:
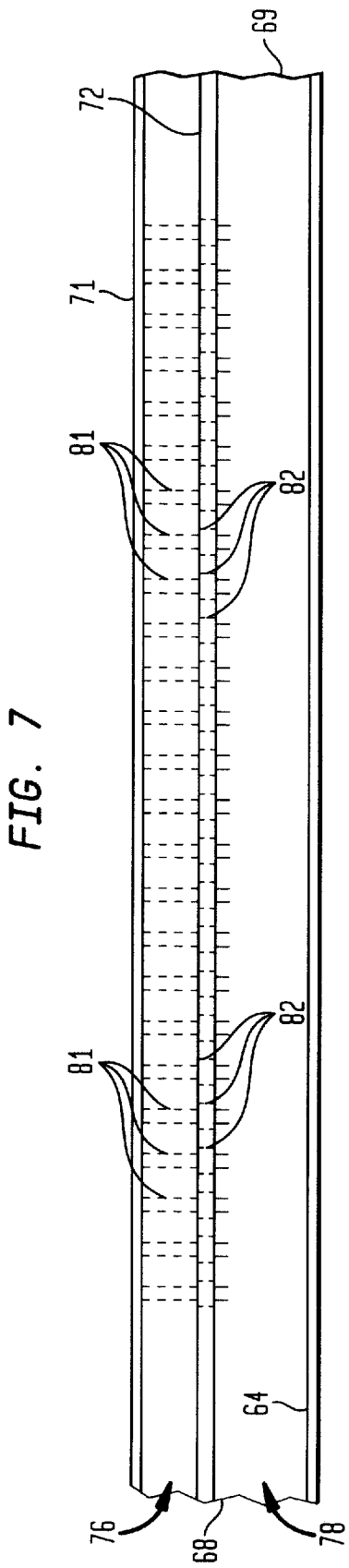
FIG. 7 is a cross-sectional view of the wet gas stripper shown in FIG. 6.

An alternative embodiment of the wet gas stripper 60 for mounting to a vehicle exhaust pipe "P" is shown in FIGS. 6 and 7. The gas stripper 60 includes a housing 61 having top and bottom walls 62 and 64, opposing side walls 65 and 66, and opposing end walls 68 and 69. First and second spaced intermediate walls 71 and 72 are arranged parallel to the top and bottom walls 62 and 64 to define an exhaust chamber 74, a water chamber 76, and a gas stripping chamber 78, respectively. The exhaust pipe "P" of the vehicle connects to the exhaust chamber 74 through an exhaust inlet formed in the front end wall 68 of the housing 61.

As shown in FIG. 7, the exhaust chamber 74 communicates with the water chamber 76 through 140, 0.25-inch diameter open-ended tubes 81 which direct substantially all of the exhaust entering the housing 61 downwardly through the water chamber 76 and into the gas stripping chamber 78. The tubes 81 pass vertically through the water chamber 76 and through 0.3125-inch diameter openings 82 formed in the second intermediate wall 72.

A pressurized water line 84 is connected to the water chamber 76 to fill the water chamber 76 and force water outwardly through the annular space between the tubes 81 and the openings 82 formed in the second intermediate wall 72. The water exiting the water chamber 76 is sprayed against the bottom wall 64 of the housing 61 in the stripping chamber 78, thereby creating a particulate-entraining turbulent mist. The turbulent mist forms a filtration medium which captures the particulate matter entrained in the exhaust and carries the particulate matter outwardly from the stripping chamber 78 through one or more openings (not shown) formed in the bottom wall 64 of the housing 61 to a collection reservoir 88. The captured particulate matter entrained in the water is removed from the reservoir 88 through an outlet line 91 to a remote storage tank (not shown).

The filtered exhaust enters the reservoir 88 through the one or more openings formed in the bottom wall 64 of the housing 61, and exits the gas stripper 60 through an exhaust outlet pipe 92 connected to the reservoir 88. Preferably, the water from the pressurized water line 84 is pumped from the remote storage tank using a pressure pump operating off the fan belt of the vehicle, or operating electrically, or by pressure created by the exhaust. The dimensions of the gas stripper according to this embodiment are approximately 4 in.×6 in.×24 in. According to vehicle emissions testing, the gas stripper 60 when attached to the vehicle exhaust pipe reduced the hydrocarbons in the exhaust from 274 ppm to 220 ppm, reduced the carbon monoxide from 3.29% to 1.17%, and increased the carbon dioxide from 12.0% to 13.1%.

According to a further alternative embodiment, the wet gas stripper includes a cylindrical housing with a centrally disposed water spray tube. The spray tube includes a number of longitudinally-spaced orifices through which water is sprayed against the housing to create a particulate-entraining, turbulent mist. The housing of this embodiment may also be rectangular. In addition, although the wet gas strippers 10 and 60 described above use water to create the filtration medium, many other suitable liquids may be used instead of water.

A wet gas stripper is described above. Various details of the invention may be changed without departing from its scope. Furthermore, the foregoing description of the preferred embodiment of the invention and the best mode for practicing the invention are provided for the purpose of illustration only and not for the purpose of limitation-the invention being defined by the claims.

I claim:

1. A wet gas stripper for separating particulate matter entrained in a moving gas stream comprising:
    (a) a housing including a plurality of walls and a gas inlet for receiving the moving gas stream into the housing and a gas outlet through which the moving gas stream is exhausted from the housing:
    (b) a particulate collection area formed at a base of the housing;
    (c) liquid spray means for spraying a stream of liquid against at least one of the walls of the housing above the particulate collection area in a direction which intersects the moving gas stream and then collides with the wall to create a particulate-entraining turbulent mist, said mist defining a filtration medium for capturing the particulate matter entrained in the gas stream and carrying the particulate matter to the collection area for removal from the housing, said liquid stream colliding with sufficient force to generate negative ions whereby the liquid mist acquires an electrostatic charge to capture the particulate matter entrained in the moving gas stream, said housing being constituted by a rectangular duct defined by top and bottom walls having joined thereto a pair of opposing side walls and a plurality of spaced baffles bridging the side walls and alternately spaced from the top and bottom walls to create a series of intercoupled stations through which the gas stream fed into the gas inlet at one end of the duct travels up and down through the successive stations in the series in a sinuous path toward the gas outlet at the other end of the duct, said spray means in each of said stations being mounted on said one of the side walls to project a liquid stream at high velocity to intersect the gas stream flowing through the station and collide with the opposing side wall to produce said particulate-entraining mist.

2. A wet gas stripper as set forth in claim 1 in which the spray means at each station is formed by a row of spaced nozzles mounted along a vertical axis.

3. A wet gas stripper as set forth in claim 1, further including blower means to feed said gas stream at high velocity into said gas inlet.

4. A wet gas stripper as set forth in claim 1, further including means to collect water sprayed onto a wall of said housing and to recirculate liquid collected in said particulate collection area back to said liquid spray means.

5. A wet gas stripper as set forth in claim 1, further including means to skim residue from the surface of liquid in said particulate collection area.

6. A wet gas stripper as set forth in claim 1, in which said particulate collection area includes a waste collection opening.

7. A wet stripper as set forth in claim 1, in which included in the duct adjacent the gas outlet is a gas reduction station having a large volume serving to reduce the velocity of the gas stream to release the moisture therein before the gas stream goes into the gas outlet.

8. Apparatus as set forth in claim 1, in which the means to project the liquid is constituted by a vertical row of spaced nozzles mounted on one of said side walls.

9. Apparatus adapted to separate particulate matter and other contaminants from a contaminated gas stream comprising:
    (a) a treatment station defined by a pair of opposing side walls joined to top and bottom walls;
    (b) means to flow an incoming contaminated gas stream through said station in a path generally parallel to said side walls and to then discharge the stream from the station;
    (c) means projecting a liquid stream from one of the side walls toward the opposing side wall to intersect the gas stream flowing in a path parallel to the side walls, said liquid stream being projected with a velocity causing it to collide with said opposing side wall with sufficient force to generate negative ions and thereby create an electrostatically-charged mist which acts to capture the particulate matter in the gas stream whereby the gas discharged from the station is substantially free of particulate matter; and
    (d) means to collect the captured particulate matter.

* * * * *